United States Patent
Oikawa

(10) Patent No.: US 8,670,337 B2
(45) Date of Patent: Mar. 11, 2014

(54) RADIO COMMUNICATION APPARATUS, RADIO COMMUNICATION METHOD, COMMUNICATION CONTROL APPARATUS, AND PROGRAM

(75) Inventor: Tomoya Oikawa, Tokyo (JP)

(73) Assignee: Sony Corporation (JP)

( * ) Notice: Subject to any disclaimer, the term of this patent is extended or adjusted under 35 U.S.C. 154(b) by 344 days.

(21) Appl. No.: 12/930,815

(22) Filed: Jan. 18, 2011

(65) Prior Publication Data

US 2011/0182195 A1  Jul. 28, 2011

(30) Foreign Application Priority Data

Jan. 25, 2010 (JP) ................ P2010-013193

(51) Int. Cl.
 *H04L 12/26* (2006.01)
(52) U.S. Cl.
 USPC ......................... 370/252; 370/469
(58) Field of Classification Search
 None
 See application file for complete search history.

(56) References Cited

U.S. PATENT DOCUMENTS

| 8,315,312 | B2 * | 11/2012 | Nagafuji | 375/240.25 |
| 2008/0151776 | A1 | 6/2008 | Kure | |
| 2009/0254794 | A1 * | 10/2009 | Malik et al. | 714/776 |
| 2011/0161771 | A1 * | 6/2011 | Zheng et al. | 714/752 |

FOREIGN PATENT DOCUMENTS

JP  2008-160499 A  7/2008

OTHER PUBLICATIONS

"Space Division Multiplexing (SDM) for OFDM System", A. van Zelst, et al., IEEE Proceeding of VTC-Spring 2000, pp. 6-10, 1998.
"Space-Time Coded OFDM for High Data-Rate Wireless Communication over Wideband Channels", D. Agrawal, et al., IEEE Proceeding of VTC '98, pp. 2232-2236, 1998.

* cited by examiner

*Primary Examiner* — Rhonda Murphy
(74) *Attorney, Agent, or Firm* — Lerner, David, Littenberg, Krumholz & Mentlik, LLP

(57) ABSTRACT

There is provided a radio communication apparatus including a detection unit to detect first redundant information indicating redundancy at a physical/MAC layer of radio communication, a communication control unit to determine a second redundancy at an upper layer from the layer based on the first redundant information detected by the detection unit, a packetizing unit to generate a data packet by packetizing transmission data, and a redundant encoding unit to add a redundant packet to the data packet generated by the packetizing unit based on the second redundancy determined by the communication control unit.

6 Claims, 8 Drawing Sheets

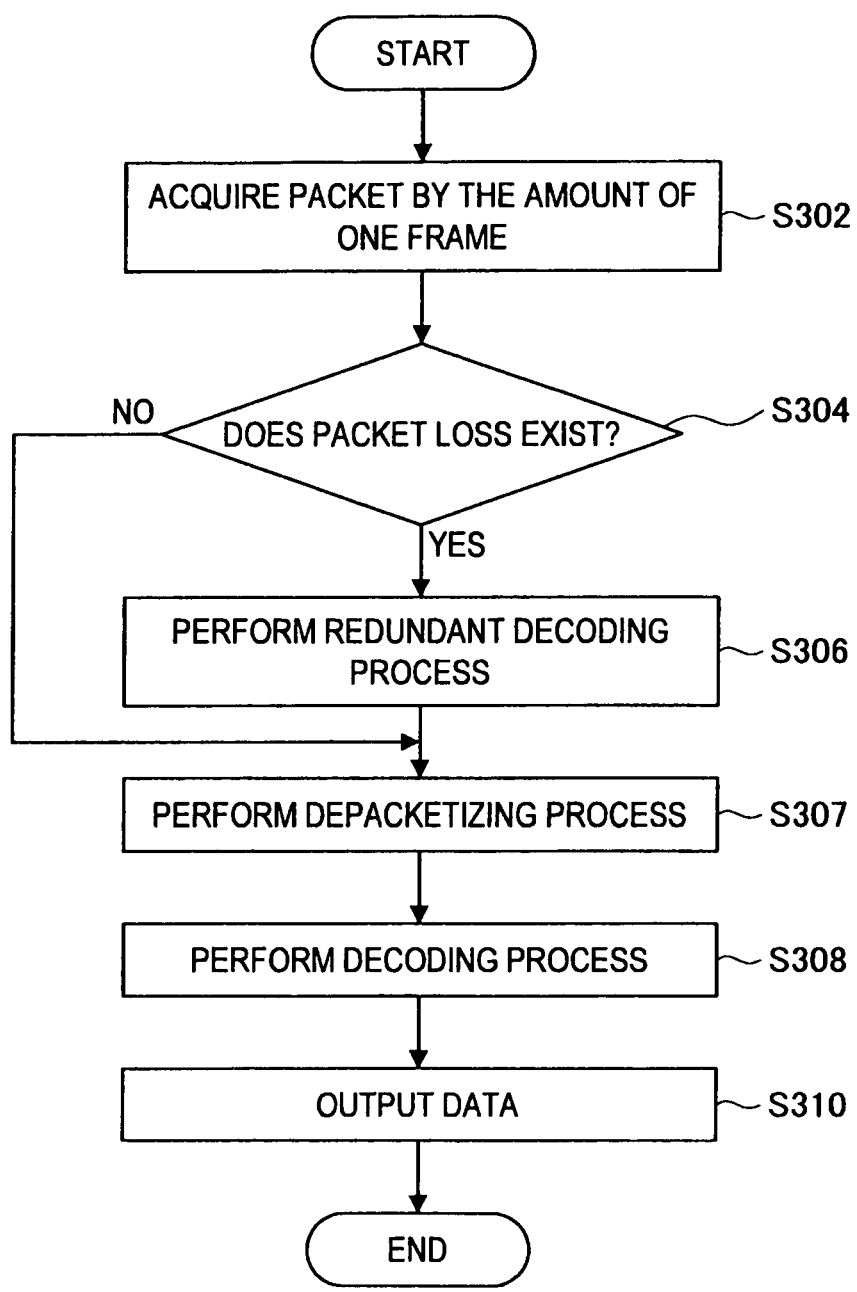

RADIO COMMUNICATION APPARATUS, RADIO COMMUNICATION METHOD, COMMUNICATION CONTROL APPARATUS, AND PROGRAM

CROSS-REFERENCE TO RELATED APPLICATION

The present application claims priority from Japanese Patent Application No. JP 2010-013193 filed in the Japanese Patent Office on Jan. 25, 2010, the entire content of which is incorporated herein by reference.

BACKGROUND OF THE INVENTION

1. Field of the Invention

The present invention relates to a radio communication apparatus, a radio communication method, a communication control apparatus, and a program.

2. Description of the Related Art

Recently, in accordance with spread of broadband, data of large file size such as video and audio have been transmitted and received on a network. A stream type transmission method is one of transmission methods utilized for transmitting multimedia files such as video and audio. With a download type transmission method in the related art, the file cannot be replayed until the file transfer is completed. However, with the stream type transmission method, received data can be replayed in parallel to the data transfer. Accordingly, the stream type transmission method has been utilized for services such as Internet telephone, video telephone, and video on demand.

An RTP (real-time transport protocol) method defined in IETF RFC3550 is one of Internet technologies appropriate for the stream type transmission method. In data transfer with the RTP method, timestamp is added to a packet as time information. Accordingly, temporal relation between a transmitting side and a receiving side can be perceived, so that synchronized replay can be performed without being affected by delay fluctuation (i.e., jitter) in packet transfer.

Here, the RTP method does not guarantee data transfer in real time. Since priority, setting and managing of packet delivery are not included in transport services provided by the RTP, RTP packets have possibility of causing delivery delay and packet loss similarly to other packets.

A forward error correction encoding method (hereinafter, also called FEC method) utilized at an application layer is a technique to improve reliability of data transfer utilizing the RTP method. The FEC method is a recovery technology of lost packets by utilizing redundant encoding. A communication apparatus at the transmitting side generates a redundant packet (i.e., a parity packet) from a transmission packet and adds to the transmission packet and a communication apparatus at the receiving side decodes the transmission packet by utilizing the added redundant packet, so that a lost packet can be recovered (for example, Japanese Patent Application Laid-Open 2008-160499).

By the way, recently, MIMO (multiple-input multiple-output) utilizing plural transmission antennas has been recognized as an effective method in radio transmission of high bit rate and has been actualized at a physical layer of a radio system such as IEEE802.11n and a MAC (media access control) layer.

SDM (space division multiplexing) and STBC (space-time block coding) are included in typical signal processing modes for communication in the MIMO. With the SDM, space streams are multiplexed by simultaneously transmitting plural space streams from plural transmission antennas, so that the transmission bit rate speeds up (for example, see A. van Zelst, R. van Nee, and G. A. Awater, "Space Division Multiplexing (SDM) for OFDM System" IEEE Proceeding of VTC-Spring 2000, pp. 6-10, 1998). With the STBC, error tolerability of transmission bits is enhanced by simultaneously transmitting a space stream under restraint conditions from transmission antennas being more than the number of the space streams (for example, see D. Agrawal, V. Tarokh, A. Naguib, and N. Seshadri, "Space-Time Coded OFDM for High Data-Rate Wireless Communication over Wideband Channels", IEEE Proceeding of VTC '98, pp. 2232-2236, 1998).

With the SDM among the above, transmission data is distributed into plural streams and sent out by utilizing plural antennas at the transmitting apparatus side and a signal process utilizing channel characteristics is performed against space multiplexed signals received from plural antennas at the receiving apparatus side, so that space is separated. Accordingly, signals for each stream can be taken out without crosstalk. According to the MIMO communication method, expansion of transmission capacity is achieved in accordance with the number of antennas without widening the frequency band, so that communication speed can be improved. Since the plural space streams are simultaneously transmitted from the plural transmission antennas, the SDM is remarkably effective in transmission rate acceleration. However, as the transmission characteristics being dependent on transmission conditions, there is a disadvantage that the transmission performance is drastically lowered in the case that propagation passage correlation between antennas is high or that SNR (signal to noise ratio) is low, for example.

Meanwhile, with the STBC, transmission information is transmitted with restraint conditions from the plural transmission antennas. That is, transmission is performed as enhancing redundancy. Accordingly, compared to the SDM, speeding up of the transmission rate cannot be achieved. However, there is an advantage that deterioration of transmission performance is small and high diversity effect can be obtained even in the case of high propagation passage correlation between antennas or in the case of low SNR.

Accordingly, in the radio communication apparatus utilizing the MIMO, an apparatus to utilize two modes of the SDM and the STBC as dynamically switching in accordance with radiowave situations has been proposed.

SUMMARY OF THE INVENTION

However, with the radio communication apparatus in which the physical/MAC layer utilizes the SDM mode and the STBC mode as dynamically switching therebetween, there has been an issue that redundant packets are excessively added and the band thereof is consumed in vain when the FEC is applied to an application layer QoS (quality of service). That is, in the related art, the FEC utilized at the application layer is independent from the information of lower layers and the FEC redundancy is calculated as assuming a recovery rate at a single channel (SISO: single-input single-output). Accordingly, in the STBC mode, despite of being transmitted with redundancy enhanced at the physical layer and the MAC layer, redundant packets are further added at the application layer similarly to the case of the SDM mode.

In light of the foregoing, it is desirable to provide a novel and improved radio communication apparatus, a radio communication method, a communication control apparatus and a program capable of dynamically varying redundancy of error correction encoding of transmission data at an upper layer in accordance with redundancy at a lower layer.

According to an embodiment of the present invention, there is provided a radio communication apparatus including a detection unit to detect first redundant information indicating redundancy at a physical/MAC layer of radio communication, a communication control unit to determine a second redundancy at an upper layer from the layer based on the first redundant information detected by the detection unit, a packetizing unit to generate a data packet by packetizing transmission data, and a redundant encoding unit to add a redundant packet to the data packet generated by the packetizing unit based on the second redundancy determined by the communication control unit.

According to the above structure, the radio communication apparatus determines the redundancy of the error correction encoding of the transmission data at the upper layer in accordance with the redundancy of the lower layer. Since the redundancy of the redundant encoding is determined regardless of the redundancy of the lower layer in the related art, excessive redundancy more than necessary quality has been obtained and the band thereof has been used in vain. The present invention can optimize the above. That is, since control to reduce redundancy can be performed when the redundancy is already enhanced at the lower layer, the band which has been used for vain redundant packets in the related art can be allocated to the transmission data.

The detection unit may detect the first redundant information including a signal processing mode and a space stream number utilized for the radio communication, and the communication control unit may determine the second redundancy in accordance with the signal processing mode and the space stream number detected by the detection unit.

The communication control unit may perform control so that the second redundancy becomes smaller as a value of the detected maximum space stream number divided by the space stream number being larger in a case that the signal processing mode detected by the detection unit is a signal processing mode to simultaneously transmit the same data with plural antennas.

The second redundancy indicates a ratio between an original data packet number and a redundant packet number at each encoding block acquired at the redundant encoding unit, and the communication control unit may determine the original data packet number k and the redundant packet number n−k based on information of a packet loss rate, in a case that the signal processing mode detected by the detection unit is a signal processing mode to simultaneously transmit the same data with plural antennas, so as to satisfy the equation 1, where p denotes the packet loss rate, k denotes the original data packet number, n−k denotes the redundant packet number, Pt denotes a targeted encoding block loss rate, Mmax denotes the maximum number of the space stream, $_nC_j$ represents a combination in mathematics, and M denotes the space stream number.

[Equation 1]

$$P_t \geq 1 - \sum_{j=0}^{n-k} M\max/M \cdot {}_nC_j p^j (1-p)^{n-j} \quad (n > k) \quad \text{(Equation 1)}$$

According to an embodiment of the present invention, there is provided a radio communication method for a radio communication apparatus capable of being utilized as switching a signal processing mode thereof utilized for radio communication, including the steps of detecting, by a detection unit, first redundant information indicating redundancy at a physical/MAC layer of the radio communication, determining, by a communication control unit, a second redundancy at a layer upper from the layer based on the first redundant information detected by the detection unit, generating, by a packetizing unit, a data packet by packetizing transmission data, and adding, by a redundant encoding unit, a redundant packet to the data packet generated by the packetizing unit based on the second redundancy determined by the communication control unit.

According to an embodiment of the present invention, there is provided a communication control apparatus including a detection unit to detect first redundant information indicating redundancy at a physical/MAC layer of radio communication, and a communication control unit to determine a second redundancy at a layer upper from the layer based on the first redundant information detected by the detection unit.

According to an embodiment of the present invention, there is provided a program for causing a computer to function as a detection unit to detect first redundant information indicating redundancy at a physical/MAC layer of radio communication, and a communication control unit to determine a second redundancy at a layer upper from the layer based on the first redundant information detected by the detection unit.

As described above, according to the present invention, the redundancy of the transmission packets at encoding can be dynamically varied in accordance with the redundancy at the lower layer.

BRIEF DESCRIPTION OF THE DRAWINGS

FIG. 9 is a flowchart describing a packet reception process.

DETAILED DESCRIPTION OF THE EMBODIMENT

Figure 1:
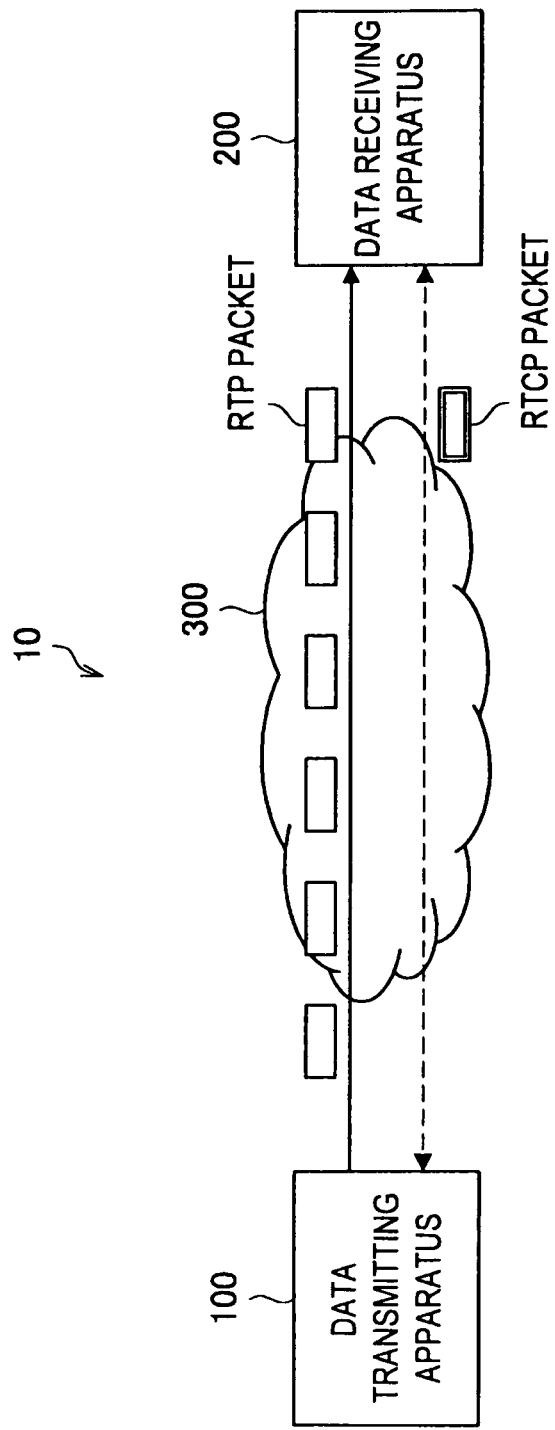
FIG. 1 is a structural view of a radio communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Here, description will be performed in the following order.
1. Structure of radio communication system
2. Structure of data transmitting apparatus
3. Transmission process
4. Example of effects
5. Structure of data receiving apparatus
6. Reception process <1. Structure of Radio Communication System>

First, a schematic structure of a radio communication system according to an embodiment of the present invention will be described with reference to FIG. 1. FIG. 1 is a structural view illustrating an example of the schematic structure of the radio communication system according to an embodiment of the present invention.

A radio communication system 10 according to an embodiment of the present invention includes a data transmitting apparatus 100 and a data receiving apparatus 200. The data transmitting apparatus 100 and the data receiving apparatus 200 are radio communication apparatuses respectively having a radio communication function and support MIMO communication. Further, the data transmitting apparatus 100 and the data receiving apparatus 200 are connected via a network 300. Data transmitted between the data transmitting apparatus 100 and the data receiving apparatus 200 is transmitted with a stream type transmitting method by utilizing the RTP type. Reliability of the data transmission is enhanced by utilizing the FEC encoding. Here, video data, audio data and the like may be mainly adopted as the data to be transmitted.

Figure 2:
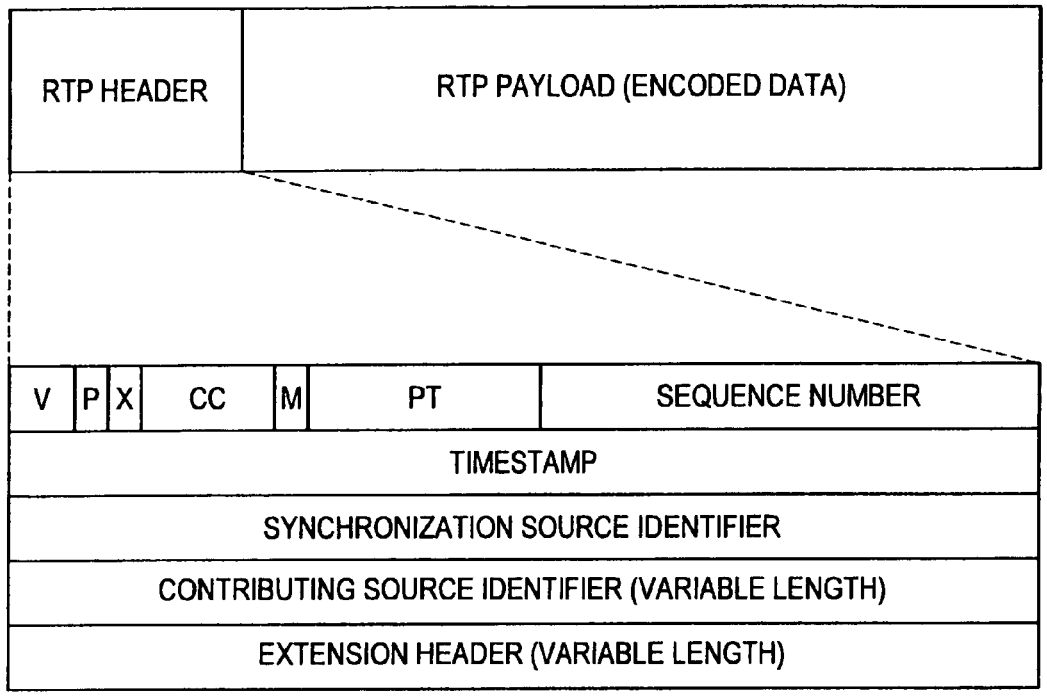
FIG. 2 is a view illustrating a format of an RTP packet.

The data transmitting apparatus 100 packetizes the transmission data and further performs the FEC encoding as the redundant encoding for each predetermined time. Then, the data transmitting apparatus 100 transmits an RTP packet as generated above to the data receiving apparatus 200. A format of the RTP packet utilized here is illustrated in FIG. 2. FIG. 2 is an explanatory view illustrating the format of the RTP packet.

The RTP packet includes an RTP header and an RTP payload. The RTP header is provided with fields for a version number V, a padding P, an extension bit X indicating presence or absence of an extension header, a CSRC count CC, marker information M, a payload type PT, a sequence number, time stamp TIMESTAMP, a synchronization source identifier, a contributing source identifier, and an extension header.

In the data receiving apparatus 200, processing time control is performed when expanding the RTP packet with the time stamp added to the RTP header, so that replay control of real-time image and audio can be performed. Here, for example, regarding the RTP packet having encoded data of dynamic image data stored, a common time stamp is set to plural RTP packets belonging to a single video frame, and then, an identifying flag which indicates being the end is stored at the RTP header of an end packet constituting each frame.

Further, the data transmitting apparatus 100 and the data receiving apparatus 200 perform transmitting and receiving of an RTCP (real-time control protocol) packet. The RTCP packet is a packet to be used as being combined with the RTP and information of data transmitting-receiving control, a transmitting terminal and a receiving terminal is described therein. The data transmitting apparatus 100 can perceive a network situation as the data receiving apparatus 200 periodically transmits the RTCP packets including a packet loss rate.

Figure 3:
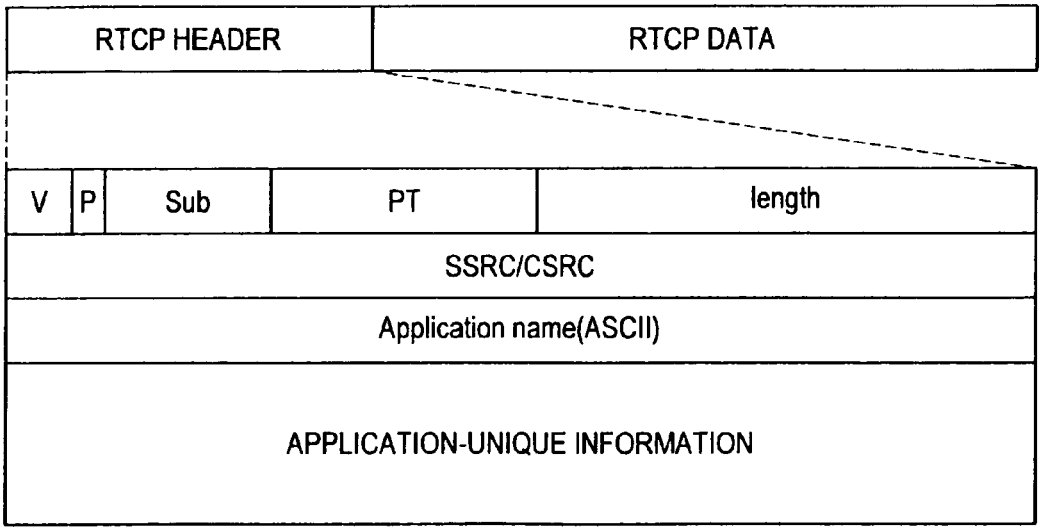
FIG. 3 is a view illustrating a format of an RTCP packet.

A format of the RTCP packet is illustrated in FIG. 3. FIG. 3 is an explanatory view illustrating the format of the RTCP packet. The RTCP packet includes an RTCP header and RTCP data. The RTCP header is provided with fields for a version information V, a padding P, a subtype Sub, a packet type PT, length information Length, an SSRC (synchronization source)/CSRC (contributing source) identifier, and an application name described in ASCII. Then, information being unique to the application is added subsequently.

Here, the MIMO (multiple-input multiple-output) with plural transmitting-receiving antennas is utilized for the communication between the data transmitting apparatus 100 and the data receiving apparatus 200. The SDM mode and the STBC mode are utilized as being dynamically switched as the signal processing method thereof on the physical/MAC layer. As described above, the SDM mode is a type to simultaneously transmit plural kinds of information by utilizing plural antennas and the STBC mode is a type to simultaneously transmit the same information plurally by utilizing plural antennas. That is, communication by utilizing the STBC mode has redundancy previously enhanced at the physical/MAC layer.

However, in the related art, even in either case of that the SDM mode is utilized and that the STBC mode is utilized at the physical/MAC layer, that is, regardless of being redundant or not, redundant encoding for error correction has been performed at an application layer evenly at the same redundancy. Accordingly, there has been a case that redundant packets are excessively added more than necessary quality in the case of the STBC mode and the limited band is consumed in vain. Next, a structure of the data transmission apparatus according to the present embodiment invented to address the above issue will be described.

<2. Structure of Data Transmitting Apparatus>

Figure 4:
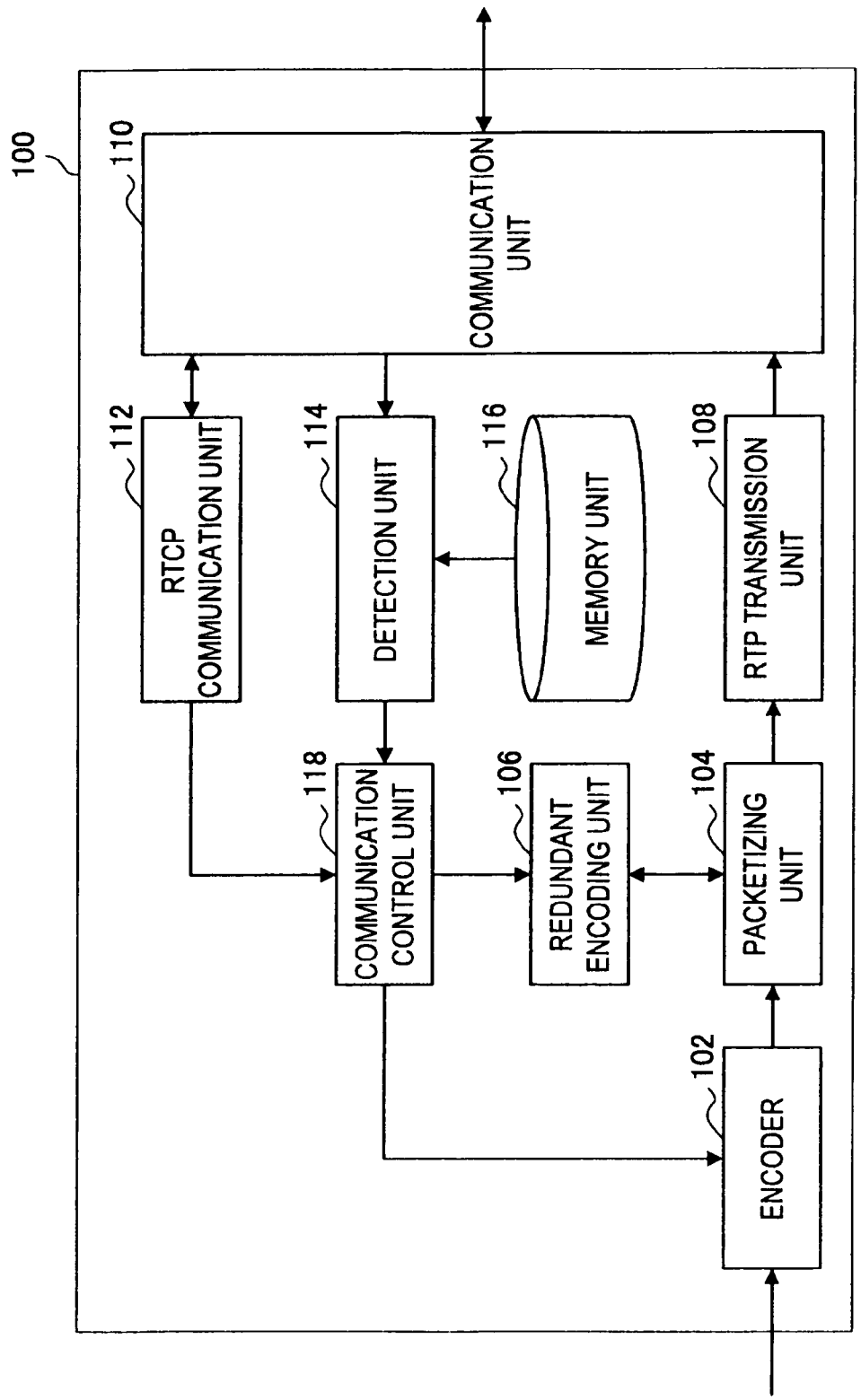
FIG. 4 is a block diagram illustrating a structure of a data transmitting apparatus according to the present embodiment.

A structure of the data transmitting apparatus 100 according to the present embodiment will be described with reference to FIG. 4. FIG. 4 is a functional block diagram illustrating the structure of the data transmitting apparatus 100 according to the present embodiment.

The data transmitting apparatus 100 mainly includes an encoder 102, a packetizing unit 104, a redundant encoding unit 106, an RTP transmission unit 108, a communication unit 110, a communication control unit 118, a detection unit 114, a memory unit 116, and an RTCP communication unit 112.

The encoder 102 has functions to perform an encoding process against the transmission data and to perform a compression process such as MPEG2, MPEG4 and JPEG2000, for example. The encoder 102 generates encoded data compressed based on a data rate notified by the communication control unit 118 and inputs the encoded data to the packetizing unit 104.

The packetizing unit 104 generates a data packet as packetizing the transmission data in accordance with the RTP. The RTP is defined in IETF RFC3550. The packetizing unit 104 performs a process to generate a packet having the encoded data input from the encoder 102 as payload. Packetizing is performed by adding the RTP header illustrated in FIG. 2 to the payload data.

The redundant encoding unit 106 adds a redundant packet by performing the FEC redundant encoding for each predetermined unit time to the packet generated at the packetizing unit 104. At that time, the redundant encoding unit 106 performs redundant encoding by utilizing a vanishment error correcting code such as RS (reed-solomon) code having plural pieces of packets for each predetermined unit time as an original data packet of a single FEC block. For example, in the case that (n, k) RS code is utilized, the redundant encoding unit 106 generates (n−k) pieces of redundant packets from k pieces of redundant un-encoded original data packets. Here, n is larger than k. The redundancy indicating the ratio between the original data packets and the redundant packets at that time is determined by the communication control unit 118. The redundant encoding unit 106 performs the FEC encoding in accordance thereto. Further, the redundant encoding unit 106 inputs the redundant-encoded packets to the RTP transmission unit 108.

The RTP transmission unit 108 transmits the packet constituting each encoding block input from the redundant encoding unit 106 to the network 300 as adding an IP header thereto.

The communication unit 110 corresponding to a physical/MAC layer in a radio system is an interface to transmit and receive radio signals such as RTP packets and RTCP packets with another radio communication apparatus. The communication unit 110 has functions as the transmitting unit and the receiving unit.

The RTCP communication unit 112 performs communication of RTCP packets with another radio communication apparatus. The RTCP is defined in IETF RGC3550. The RTCP communication unit 112 receives the RTCP packets including the packet loss rate information from the data receiving apparatus 200. The packet loss rate information is utilized in a rate allocation process at the communication control unit 118.

The detection unit 114 detects first redundant information indicating redundancy at the physical/MAC layer of radio communication. Specifically, the detection unit 114 acquires MCS (modulation and coding set) set information from a driver and the like supporting API, function or radio hardware. The MCS set is a set of a modulation method, a coding method, a space stream number and a data rate and is present as plural pieces of lists. The detection unit 114 compares the acquired MCS set information to MSC set information which is previously stored in the memory unit 116. Subsequently, the detection unit 114 detects discrimination whether the MIMO signal process mode is the STBC or the SDM and detects a space stream number and maximum space stream number when being the STBC. Then, the detection unit 114 inputs the first redundant information including the detected signal processing mode, space stream number and a maximum space stream number to the communication control unit 118.

The memory unit 116 being a device for data storage stores the MCS set. The MCS set is set as being previously acquired and the space stream number when setting each MCS and the maximum space stream number therein are acquired. A magnetic recording medium such as an HDD (hard disk drive) and a non-volatile memory such as an EEPROM (electronically erasable and programmable read only memory), a flash memory, a MRAM (magnetoresistive random access memory), an FeRAM (Ferroelectric random access memory) and a PRAM (phase change random access memory) may be adopted for the memory unit 116 as a specific example. However, the memory unit 116 is not limited to the above.

The communication control unit 118 has a function to control the general communication processes described above. In the present embodiment, the communication control unit 118 has a function to determine the second redundancy being the redundancy at the application layer which is an upper layer than the physical/MAC layer, that is, the encoding redundancy at the redundant encoding unit 106, based on the first redundant information (that is, information indicating the redundancy at the physical/MAC layer) especially including the signal processing mode of the MIMO, the space stream number and the maximum space stream number. In addition, the communication control unit 118 notifies the encoder of the data rate determined as being based on the redundant.

Specifically, the communication control unit 118 determines whether or not the signal processing mode of the MIMO utilized in the radio communication apparatus has redundancy and determines the encoding redundancy in accordance with the space stream number utilized for the data transmission. That is, the communication control unit 118 controls the second redundancy used for redundant encoding to be smaller as the value of the maximum space stream number used for the transmission divided by the space stream number being larger in the case of the STBC mode in which the same information is simultaneously transmitted plurally from plural antennas.

<3. Transmission Process>

Figure 5:
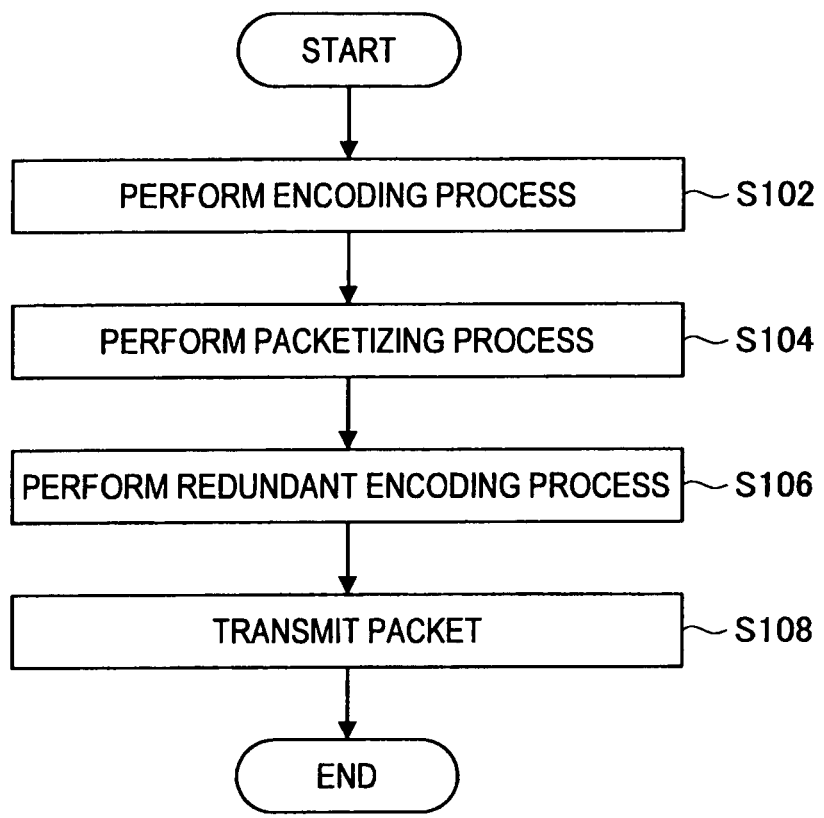
FIG. 5 is a flowchart describing a packet transmission process.
Figure 6:
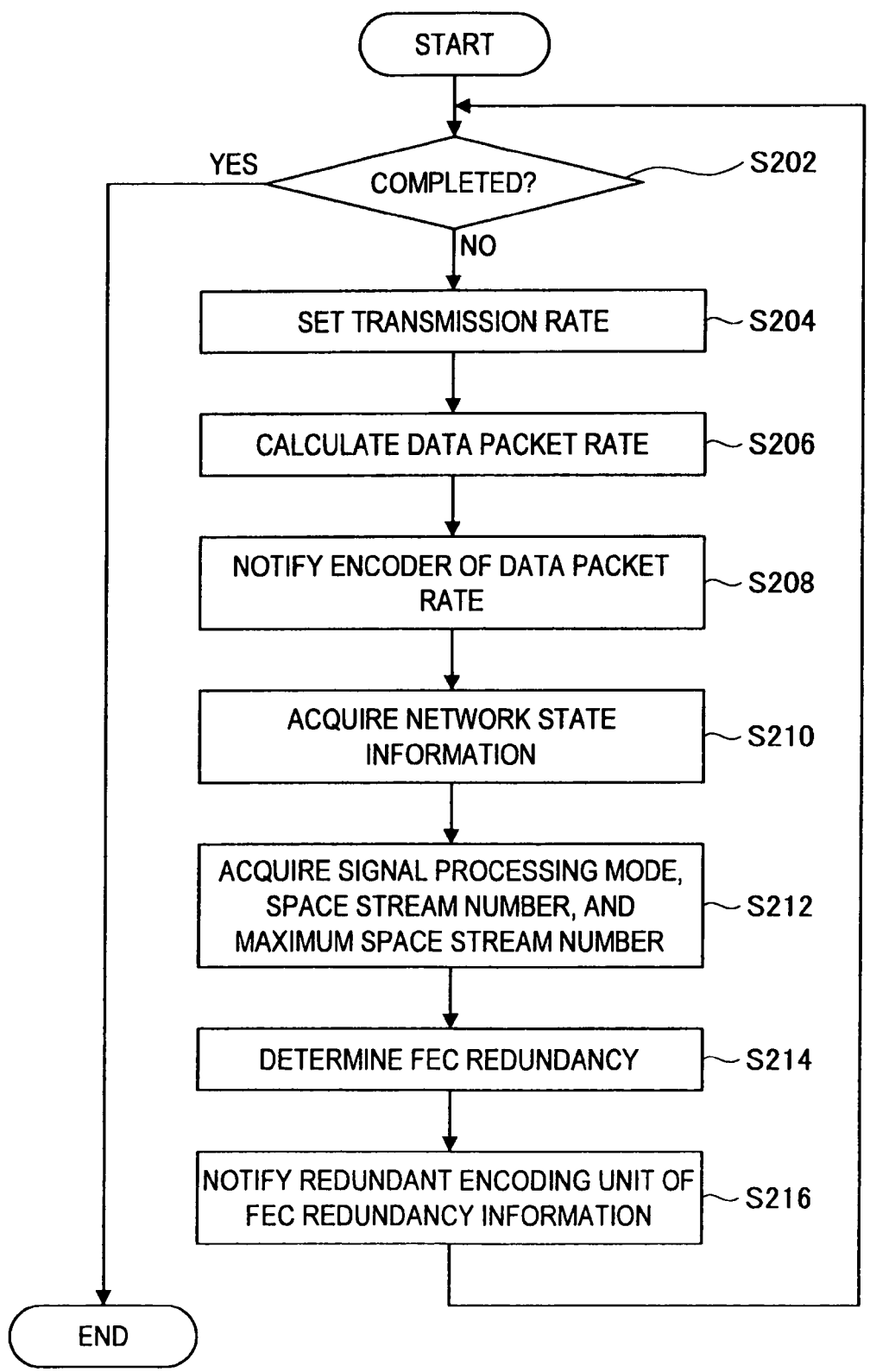
FIG. 6 is a flowchart describing a redundancy determination process.

Next, the transmission process of the data transmitting apparatus 100 will be described with reference to FIGS. 5 and 6. FIG. 5 is a flowchart describing a packet transmission process. FIG. 6 is a flowchart describing a redundancy determination process.

Referring to FIG. 5, in the flow of the entire transmission process, the data transmitting apparatus 100 firstly performs an encoding process at the encoder 102 (S102). Specifically, the encoder 102 generates encoded data being compressed based on the data rate notified from the communication control unit 118 against the transmission data and inputs the encoded data to the packetizing unit 104.

Then, the packetizing unit 104 having the encoded data input from the encoder 102 generates a packet having the input encoded data as payload in accordance with the RTP (S104). Next, the redundant encoding unit 106 performs the FEC redundant encoding for each predetermined time and performs the redundant encoding process to add the redundant packet on the packet generated at the packetizing unit 104 (S106). The redundant-encoded packet receives the IP header at the RTP transmitting unit and is transmitted toward the data receiving apparatus from the communication unit 110 which is the radio communication interface (S108).

The above is the overall flow of the transmission process. Next, the determination process of the data rate and the FEC redundancy at the communication control unit 118 will be described with reference to FIG. 6. The communication control unit 118 determines the redundant packet number at the FEC block acquired from the redundant encoding unit 106. However, in the case of transmitting video data, for example, the communication control unit 118 determines the redundancy for each frame of the video data.

First, the communication control unit 118 decides whether or not the determination process of the data rate and the redundancy is completed (S202). For example, when a user directs to finish data transmission, the communication control unit 118 decides to finish the determination process of the data rate and the redundancy. Here, in the case of being determined not to be finished, the communication control unit 118 subsequently determines the total transmission rate (S204) and further determines the data packet rate (S206). At that time, the communication control unit 118 performs rate control in accordance with IETF RFC3448 "TCP friendly rate control (TFRC): protocol specification". The communication control unit 118 determines the total transmission rate and the data packet rate based on the network state information such as the packet loss rate and reciprocating transmission tardiness (RTT) from the RTCP communication unit 112 and the redundancy from the redundant encoding unit 106.

Then, the communication control unit 118 notifies the encoder 102 of the calculated data packet rate (S208). Next, the communication control unit 118 acquires the network state information and the first redundant information including the signal processing mode, the space stream number and the maximum space stream number (S210 and S212).

Here, for example, the network state information may be acquired through the RTCP SR (sender report) packet and RTCP RR (receiver report) packet described in IETF RFC3550 transmitted and received between the RTCP communication unit 112 of the data transmitting apparatus 100 and a later-mentioned RTCP communication unit of the data receiving apparatus. A variety of parameters such as the reciprocating transmission tardiness (RTT) and the packet loss rate may be utilized as the network state information.

Then, the communication control unit 118 subsequently determines the FEC redundancy (S214). Here, the FEC redundancy is determined in the following process. The communication control unit 118 calculates the necessary redundancy so that the packet loss rate acquired in step S210 satisfies a targeted block loss rate after the FEC decoding. For example, the communication control unit 118 determines the original data packet number k and the redundant packet number n−k so as to satisfy following equation 1. Here, p denotes the packet loss rate, k denotes the original data packet number, n−k denotes the redundant packet number, Pt denotes the targeted encoding block loss rate, M denotes the space stream number, and Mmax denotes the maximum space stream number.

$$P_t \geq 1 - \sum_{j=0}^{n-k} M\max/M \cdot {}_nC_j p^j (1-p)^{n-j} (n > k) \quad \text{(Equation 1)}$$

Here, in the case that the signal processing mode acquired in step S212 is the SDM, the communication control unit 118 can actualize a necessary loss recovery rate by adding an FEC packet similar to that in a single channel. This is because the SDM transmits the information by the amount of the maximum space stream number. Accordingly, in the case that the signal processing mode is the SDM, the communication control unit 118 calculates the original data packet number k and the redundant packet number n−k so as to satisfy the above equation 1 where M=Mmax is substituted.

Meanwhile, in the case that the signal processing mode acquired in step S212 is the STBC, the communication control unit 118 calculates the original data packet number k and the redundant packet number n−k so as to satisfy equation to which influence of the space stream number M and the maximum space stream number Mmax is reflected. As described above, in the STBC, plural antennas are utilized and the same information is simultaneously transmitted plurally in the stream number equal to or smaller than the maximum space stream number from the respective antennas. Thus, it is already redundant. Accordingly, when enhancing of the FEC redundancy is performed similarly to the case of the SDM and the transmission utilizing a single channel, there is extremely high possibility that excessive redundancy is obtained in vain. Then, in the case of communication utilizing the STBC, the space stream number is considered in the calculation of the redundancy in order to control the FEC redundancy to be lessened as the maximum space stream number divided by the space stream number utilized for the transmission being larger.

Subsequently, the communication control unit 118 notifies the redundant encoding unit 106 of the determined FEC redundancy information (S216).

<4. Example of Effects>

As described above, the data transmitting apparatus 100 according to an embodiment of the present invention lowers the FEC redundancy (i.e., lessens the FEC redundant packet number) as the utilized maximum space stream number becomes larger in consideration with the space stream number utilized for transmission when calculating redundancy in the FEC encoding which is redundancy at the application layer in the case that the signal processing mode of the MIMO is the STBC, that is, redundancy is enhanced at the physical/MAC layer level.

Figure 7:
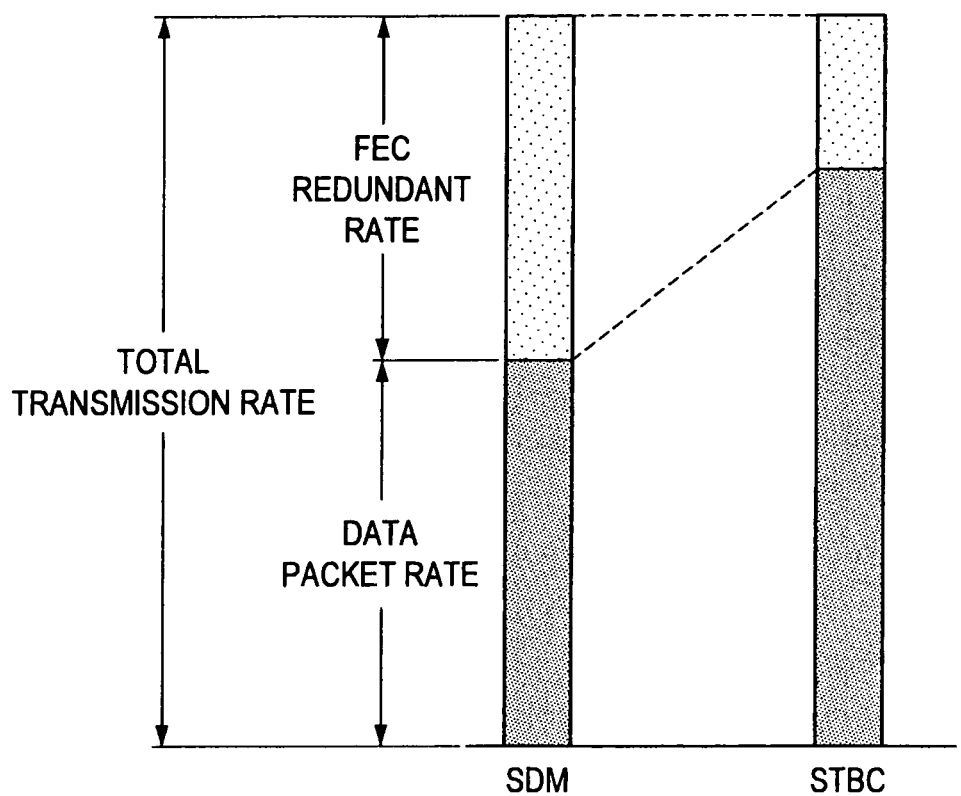
FIG. 7 is an explanatory view describing effect of the radio communication apparatus according to the present embodiment.

With the above structure, compared to the case that the signal processing mode utilized for radio communication is the SDM, the ratio of the data packet rate being the transmission rate of the transmitting data main body can be increased since the FEC redundant rate in the total transmission rate is lowered in the case of the STBC, as illustrated in FIG. 7 for example. In the case of dynamic image transmission, there is an advantage that image transmission can be actualized in higher quality compared to the related art, for example. Since the band occupied due to vain redundancy in the related art can be allocated to transmission of transmission data, streaming communication can be effectively actualized.

Further, in the related art, since encoding of the FEC needs longer processing time as redundancy becomes higher, delay has been increasingly caused. With the data transmitting apparatus according to the present embodiment, since the redundancy is optimized and possibility of encoding at vainly high redundancy can be reduced, there is an effect that delay can be suppressed.

<5. Structure of Data Receiving Apparatus>

Figure 8:
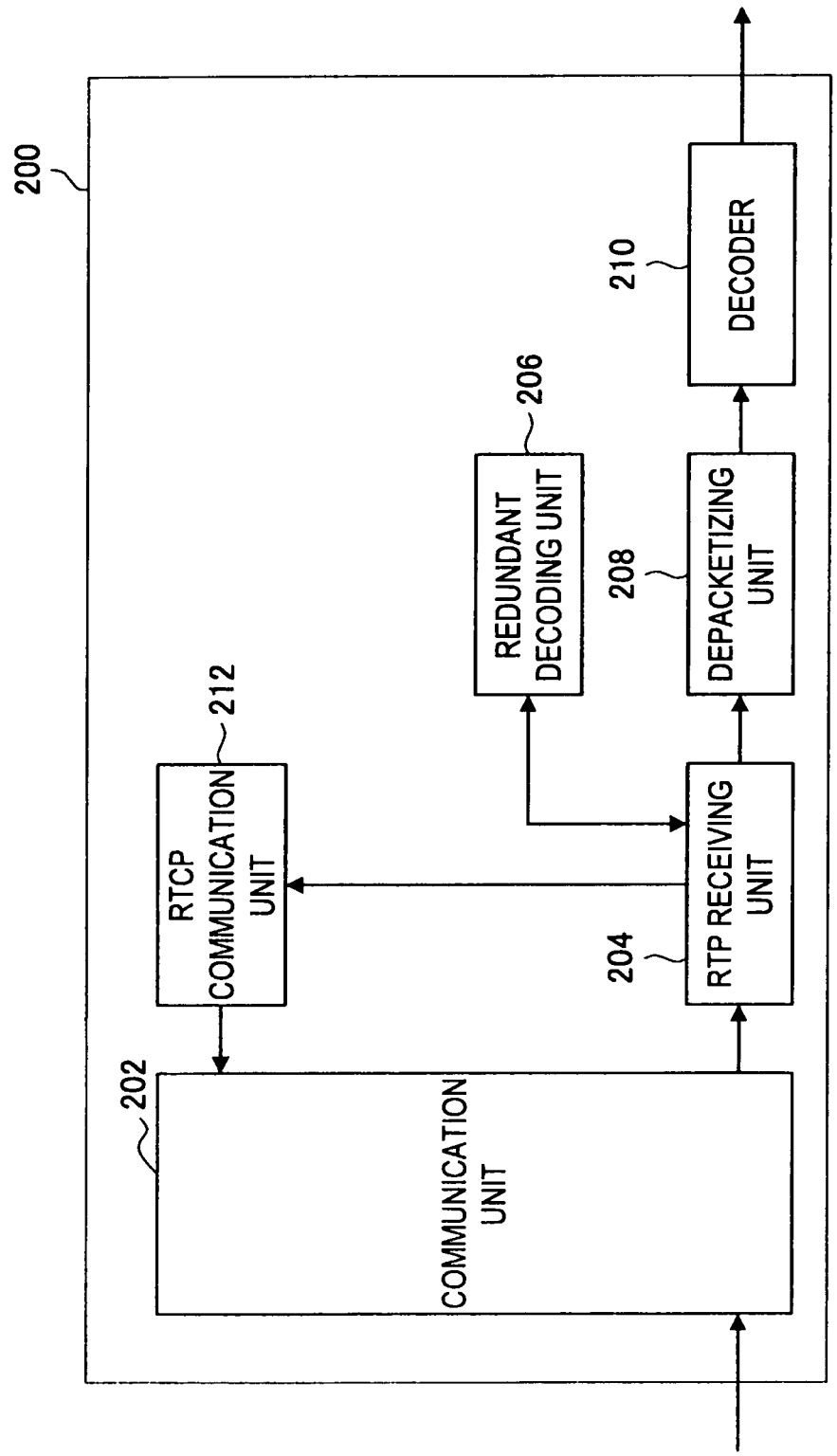
FIG. 8 is a block diagram illustrating a structure of a data receiving apparatus according to the present embodiment.

Next, a structure of the data receiving apparatus 200 to receive streaming data transmitted from the data transmitting apparatus 100 will be described with reference to FIG. 8. FIG. 8 is a block diagram illustrating a structure of the data receiving apparatus.

The data receiving apparatus 200 mainly includes a communication unit 202, an RTP receiving unit 204, a redundant decoding unit 206, a depacketizing unit 208, and a decoder 210.

The communication unit 202 corresponding to a physical/MAC layer of radio system is an interface to transmit and receive radio signals such as RTP packets and RTCP packets with another radio communication apparatus. The communication unit 202 has functions as the transmitting unit and the receiving unit.

The RTP receiving unit 204 receives packets transmitted from the data transmitting apparatus 100 via the network 300 and temporally stores in an integrated receiving buffer. In the case that the original data packet among packets of each FEC block maintained in the receiving buffer has loss, received packet is input to the redundant decoding unit 206 when decoding is possible. Then, the RTP receiving unit 204 inputs, to the depacketizing unit 208, the packet directly when the original data packet does not have loss, and the packet decoded by the redundant decoding unit 206 when the original data packet has loss. Further, the RTP receiving unit 204 notifies the RTCP communication unit 212 of the packet loss rate information.

The redundant decoding unit 206 functions to recover the lost packet as performing the FEC decoding against an input reception packet when the reception packet is input from the RTP receiving unit 204. The redundant decoding unit 206 inputs the decoded packet to the RTP receiving unit 204.

The depacketizing unit 208 analyzes the RTP packet input from the RTP receiving unit 204. Then, the depacketizing unit 208 performs analysis of the header and payload in the RTP packet and restructures the encoded data before being packetized.

The decoder 210 acquires the original data by performing the decoding process on the encoded data restructured at the depacketizing unit 208.

The RTCP communication unit 212 performs transmitting and receiving of the RTCP packet with the data transmitting apparatus 100. In the present embodiment, the RTCP communication unit 212 transmits the RTCP packet including at least the packet loss rate to the data transmitting apparatus 100. At that time, the information of the packet loss rate is provided from the RTP receiving unit as described above.

<6. Reception Process>

Next, the flow of the data reception process at the data receiving apparatus 200 will be described with reference to FIG. 9. First, in the data receiving apparatus, the RTP receiving unit 204 acquires packets by the amount of one frame (S302). Then, the RTP receiving unit 204 decides whether or not the received packets include packet loss (S304).

In the case of being decided to have packet loss in the decision of step S304, the RTP receiving unit 204 inputs the packet including the packet loss to the redundant decoding unit 206, and then, the redundant decoding unit 206 performs redundant decoding on the input packet (S306).

Meanwhile, in the case of not having packet loss, the redundant decoding process in step S306 is skipped. Subsequently, the depacketizing unit 208 performs the depacketizing process (S307), and then, the decoder 210 performs the decoding process (S308). Then, the data receiving apparatus 200 outputs the data after the decoding process is performed (S310).

It should be understood by those skilled in the art that various modifications, combinations, sub-combinations and alterations may occur depending on design requirements and other factors insofar as they are within the scope of the appended claims or the equivalents thereof.

In the above description, the data transmitting apparatus and the data receiving apparatus of the present embodiment are configured to respectively have the transmitting function or the receiving function, as an example. However, not limited to the above example, the present invention may adopt a radio communication apparatus having both functions of transmitting and receiving.

Here, in the present application, the steps described in the flowcharts include processes performed in parallel or separately even though not necessarily being processed in time sequence, naturally in addition to the processes performed in time sequence along the described order. Further, it is needless to mention that order of steps to be processed in time sequence can be appropriately changed in some cases.

What is claimed is:

1. A radio communication apparatus comprising:
a detection unit to detect first redundant information indicating redundancy at a physical/MAC layer of radio communication;
a communication control unit to determine a second redundancy at an upper layer from the physical/MAC layer based on the first redundant information detected by the detection unit;
a packetizing unit to generate a data packet by packetizing transmission data; and
a redundant encoding unit to add a redundant packet to the data packet generated by the packetizing unit based on the second redundancy determined by the communication control unit,
wherein the detection unit detects the first redundant information including a signal processing mode and a space stream number utilized for the radio communication, and the communication control unit determines the second redundancy in accordance with the signal processing mode and the space stream number detected by the detection unit.

2. The radio communication apparatus according to claim 1,
wherein the communication control unit performs control so that the second redundancy becomes smaller as a value of the detected maximum space stream number divided by the space stream number being larger in a case that the signal processing mode detected by the detection unit is a signal processing mode to simultaneously transmit the same data with plural antennas.

3. A radio communication apparatus comprising:
a detection unit to detect first redundant information indicating redundancy at a physical/MAC layer of radio communication;
a communication control unit to determine a second redundancy at an upper layer from the physical/MAC layer based on the first redundant information detected by the detection unit;
a packetizing unit to generate a data packet by packetizing transmission data; and
a redundant encoding unit to add a redundant packet to the data packet generated by the packetizing unit based on the second redundancy determined by the communication control unit,
wherein the second redundancy indicates a ratio between an original data packet number and a redundant packet number at each encoding block acquired at the redundant encoding unit; and
the communication control unit determines the original data packet number k and the redundant packet number n−k based on information of a packet loss rate, in a case that the signal processing mode detected by the detection unit is a signal processing mode to simultaneously transmit the same data with plural antennas, so as to satisfy the equation of $$P_t \geq 1 - \sum_{j=0}^{n-k} M\max/M \cdot {}_nC_j p^j (1-p)^{n-j} (n > k)$$

where p denotes the packet loss rate, k denotes the original data packet number, n−k denotes the redundant packet number, Pt denotes a targeted encoding block loss rate, Mmax denotes the maximum number of the space stream, ${}_nC_j$ represents a combination in mathematics, and M denotes the space stream number.

4. A radio communication method for a radio communication apparatus capable of being utilized as switching a signal processing mode thereof utilized for radio communication, comprising the steps of:
detecting, by a detection unit, first redundant information indicating redundancy at a physical/MAC layer of the radio communication;
determining, by a communication control unit, a second redundancy at a layer upper from the layer based on the first redundant information detected by the detection unit;
generating, by a packetizing unit, a data packet by packetizing transmission data; and
adding, by a redundant encoding unit, a redundant packet to the data packet generated by the packetizing unit based on the second redundancy determined by the communication control unit,
wherein the detecting step detects the first redundant information including a signal processing mode and a space stream number utilized for the radio communication, and the determining step determines the second redundancy in accordance with the signal processing mode and the space stream number detected by the detecting step.

5. A communication control apparatus comprising:
a detection unit to detect first redundant information indicating redundancy at a physical/MAC layer of radio communication; and
a communication control unit to determine a second redundancy at a layer upper from the layer based on the first redundant information detected by the detection unit,
wherein the detection unit detects the first redundant information including a signal processing mode and a space stream number utilized for the radio communication, and the communication control unit determines the second redundancy in accordance with the signal processing mode and the space stream number detected by the detection unit.

6. A non-transitory computer readable memory having stored thereon a program for causing a computer to function as:
a detection unit to detect first redundant information indicating redundancy at a physical/MAC layer of radio communication; and
a communication control unit to determine a second redundancy at a layer upper from the layer based on the first redundant information detected by the detection unit,
wherein the detection unit detects the first redundant information including a signal processing mode and a space stream number utilized for the radio communication, and the communication control unit determines the second redundancy in accordance with the signal processing mode and the space stream number detected by the detection unit.

* * * * *